3,457,083
COFFEE PRODUCT AND METHOD OF IMPROVING ITS FLAVOR

Jiro Kawai, Tsunehiko Ninomiya, Shinji Okumura, and Koichi Hayashi, Kanagawa-ken, Japan, assignors to Ajinomoto Co., Inc., Tokyo, Japan
No Drawing. Filed June 1, 1966, Ser. No. 554,359
Claims priority, application Japan, June 16, 1965, 40/35,492
Int. Cl. A23f 1/04
U.S. Cl. 99—65                                                7 Claims

ABSTRACT OF THE DISCLOSURE

L-arginine, when present in coffee in amounts of approximately 25 mg. per 100 ml., improves the taste of the coffee partly by increasing the pH, but the improvement cannot be achieved by other alkalinizing agents. The L-arginine may be admixed to the dry coffee at any processing stage or to the liquid extract ready to drink.

The present invention relates to a novel coffee composition, and to a method of improving its flavor.

As used throughout the specification and claims, the term "coffee" includes such coffee products as "instant" water-soluble coffee powder, and coffee containing compositions in solid or liquid form.

Lower grade coffee products have a relatively low pH value and such highly acidic coffee compositions are not as flavorsome as a high grade coffee because high acidity impairs the flavor and aroma of coffee.

We have now found that the flavor and taste of coffee and coffee containing compositions is greatly improved by the addition of a pH-increasing amount of free L-arginine.

L-arginine in its free form is alkaline, having a pH of 11.15. It is a water-soluble amino acid which occurs widely in animal and vegetable proteins, wherefrom it may be obtained by direct hydrolysis. It is essential in nutrition and plays a fundamental part in biological and pharmaceutical reactions. Thus, an intake of arginine with coffee will contribute to the maintenance of good health, in addition to the coffee stimulating the central nervous system and muscles when fatigue has set in.

We have now found that free L-arginine elevates the pH value of a coffee beverage without in any way impairing the customary flavor and aroma of coffee. We have found this effect to be specific to L-arginine, and have obtained no such favorable results with inorganic alkaline substances, such as caustic soda, which raise the pH value.

The specific amount of free L-arginine admixed to the coffee will vary according to individual tastes but, generally, an addition of 0.3 to 5.0% based on the weight of the coffee, of free L-arginine will be found satisfactory. Thus, a very flavorsome coffee composition may be prepared by mixing a water-soluble coffee powder with an amount of free L-arginine in the above range. Similarly, the flavor of an aqueous coffee solution may be improved by adding no more than 50 mg. of free L-arginine per 100 ml. of the solution.

The free L-arginine may be added to the composition at any desired stage, i.e., it may be added directly to the prepared beverage, it may be blended with a soluble coffee powder, or it may be added to coffee beans before or after roasting.

The following table indicates the relationship between amounts of free L-arginine and the pH value of a coffee composition:

TABLE 1

| Amounts of free arginine added | pH (at 25° C.) | |
|---|---|---|
| | Sample "A" | Sample "B" |
| 0 (0) | 4.95 | 4.90 |
| 0.1 (3) | 4.98 | 4.91 |
| 0.5 (15) | 5.02 | 4.96 |
| 1.0 (30) | 5.20 | 5.04 |
| 1.5 (45) | 5.46 | 5.18 |
| 2.0 (60) | 6.84 | 5.82 |

NOTE.—Samples "A" and "B" are different kinds of soluble coffee powder. Each sample was dissolved in boiling water to which 3% free arginine was added. The pH values were measured at the foregoing percentages of free arginine contents in the solution at 25°C. The figures in parenthesis indicate the amounts of arginine (unit: mg) in 100 ml of coffee.

The following examples, while in no way being limitative, illustrate the practice of this invention:

EXAMPLE 1

3.5 g. "A" brand coffee (soluble type), 7.5 g. sugar, 3 g. milk powder and 70 mg. L-arginine in free form were dissolved in 15 ml. of boiling water, and tasted together with another sample prepared with the same ingredients except arginine, and under the same conditions.

14 out of 15 qualified tasters preferred arginine-containing coffee.

EXAMPLE 2

3.5 g. "B" brand coffee (soluble type), 7.5 g. sugar, 3 g. milk powder and 28 mg. L-arginine in free form were dissolved in 15 ml. of boiling water, and tasted together with another sample prepared with the same ingredients except arginine, and under the same condition.

10 out of 15 qualified tasters preferred arginine-containing coffee.

EXAMPLE 3

To each 100 ml. of "C" brand coffee (soluble type), respectively 10 mg., 25 mg., 60 mg. of L-arginine in free form were added, and tasted by 40 tasters specially trained under the Kramer method. The result was, as shown in Table 2, that the coffee containing 25 mg. of free arginine was most preferred.

TABLE 2

| | Contents of free arginine | | |
|---|---|---|---|
| | 10 mg. | 25 mg. | 60 mg. |
| Order of preference | 94 | 64 | 82 |
| Strength of acidity | 49 | 80 | 111 |
| Strength of sweetness | 86 | 74 | 80 |
| pH | 5.05 | 5.28 | 5.00 |

The reference sample contained 3% of soluble coffee powder. The pH value of the reference sample was 5.00.

We claim:

1. A new composition of matter comprising coffee and a flavor-improving, pH-increasing amount of free L-arginine.

2. The composition of matter of claim 1, comprising from 0.3 to 5.0%, based on the weight of the coffee, of the free L-arginine.

3. The composition of matter of claim 1, wherein the coffee is in the form of a water-soluble coffee powder.

4. The composition of matter of claim 1, further comprising water wherein the coffee and the free L-arginine are dissolved, the aqueous solution having a pH value ranging from 5.2 to 5.5.

5. A method of improving the flavor of coffee, which comprises admixing a pH-increasing amount of free L-arginine to the coffee.

6. The method of claim 5, wherein from 0.3 to 5.0%, based on the weight of the coffee, of the free L-arginine is admixed to the coffee.

7. The method of claim 5, wherein the coffee is in an aqueous solution and no more than 50 mg. of the free L-arginine per 100 ml. of the solution is added to the solution.

References Cited

Chemical Abstracts, vol. 55, 1961, 4701–4702.
Sivetz, M. A.; "Coffee Processing Technology," vol. 2, 1963, Avi. Publ. Co., Westport, Conn., pp. 106–108.

MAURICE W. GREENSTEIN, Primary Examiner

U.S. Cl. X.R.

99—71